United States Patent
Kim et al.

(10) Patent No.: US 9,948,476 B2
(45) Date of Patent: Apr. 17, 2018

(54) TECHNIQUES TO ASSOCIATE USER DATA WITH A MOBILE DEVICE

(71) Applicant: Facebook, Inc., Menlo Park, CA (US)

(72) Inventors: Daniel Kim, Foster City, CA (US); Yen-Ting Tung, San Jose, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/378,345

(22) Filed: Dec. 14, 2016

(65) Prior Publication Data

US 2017/0093591 A1    Mar. 30, 2017

Related U.S. Application Data

(63) Continuation of application No. 14/549,935, filed on Nov. 21, 2014, now Pat. No. 9,554,267.

(51) Int. Cl.
| | | |
|---|---|---|
| H04W 4/00 | (2009.01) | |
| H04L 12/28 | (2006.01) | |
| H04W 8/20 | (2009.01) | |
| H04L 29/12 | (2006.01) | |
| H04W 4/02 | (2018.01) | |
| G06Q 30/02 | (2012.01) | |
| H04L 29/08 | (2006.01) | |

(52) U.S. Cl.
CPC ...... *H04L 12/2807* (2013.01); *H04L 12/2818* (2013.01); *H04L 61/6022* (2013.01); *H04L 67/306* (2013.01); *H04W 4/02* (2013.01); *H04W 4/021* (2013.01); *H04W 8/205* (2013.01); *G06Q 30/02* (2013.01); *H04L 67/02* (2013.01); *H04L 67/18* (2013.01)

(58) Field of Classification Search
CPC .......................... H04W 8/205; H04L 12/2807
USPC ........................................... 455/456.3, 435.1
See application file for complete search history.

(56) References Cited

U.S. PATENT DOCUMENTS

2012/0246336 A1    9/2012    Sathish

FOREIGN PATENT DOCUMENTS

WO        0039964        7/2000

OTHER PUBLICATIONS

Office Action received for European Patent Application No. 15168437.0, dated Jan. 25, 2017, 6 pages.
Office Action received for European Patent Application No. 15168437.0, dated Aug. 2, 2017, 6 pages.

*Primary Examiner* — Joel Ajayi

(57) ABSTRACT

Techniques to associate user data with a mobile device are described. In one embodiment, for example, an apparatus may comprise a service support component and a storage component. The services support component may be operative to receive a data package request from a service, the data package request comprising a network identifier for a mobile device associated with a user, and exchange a data package with the service in response to the data package request. The storage component may be operative to access the data package associated with the user based on the network identifier. Other embodiments are described and claimed. Other embodiments are described and claimed.

14 Claims, 11 Drawing Sheets

600

Receive a data package request from a service, the data package request comprising a network identifier for a mobile device associated with a user, the data package request comprising a service identifier associated with the service.
602

Identify a plurality of data packages associated with the user based on the network identifier.
604

Identify a data package of the plurality of data packages based on the service identifier.
606

Transmit the data package to the service in response to the data package request.
608

TECHNIQUES TO ASSOCIATE USER DATA WITH A MOBILE DEVICE

CROSS-REFERENCE TO RELATED APPLICATION

This application is a continuation of U.S. patent application Ser. No. 14/549,935 filed Nov. 21, 2014 and entitled "Techniques to Associate User Data with a Mobile Device," the contents of which is herein incorporated by reference.

BACKGROUND

Users may use mobile devices for a variety of tasks, both online and offline. Users may carry their mobile devices with them when travelling through the world and visiting locations. Mobile devices may possess hardware capable of determining their location via a global positioning system (GPS) receiver, Wi-Fi triangulation, cellular triangulation, or other means. Mobile devices may be configured for use with various services. Services may be customized to a particular user. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to associate user data with a mobile device. Some embodiments are particularly directed to techniques to associate user data with a mobile device for the customization of online and in-person services to the physical presence of a user as determined by the presence of their mobile device. In one embodiment, for example, an apparatus may comprise a service support component and a storage component. The services support component may be operative to receive a data package request from a service, the data package request comprising a network identifier for a mobile device associated with a user, and exchange a data package with the service in response to the data package request. The storage component may be operative to access the data package associated with the user based on the network identifier. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
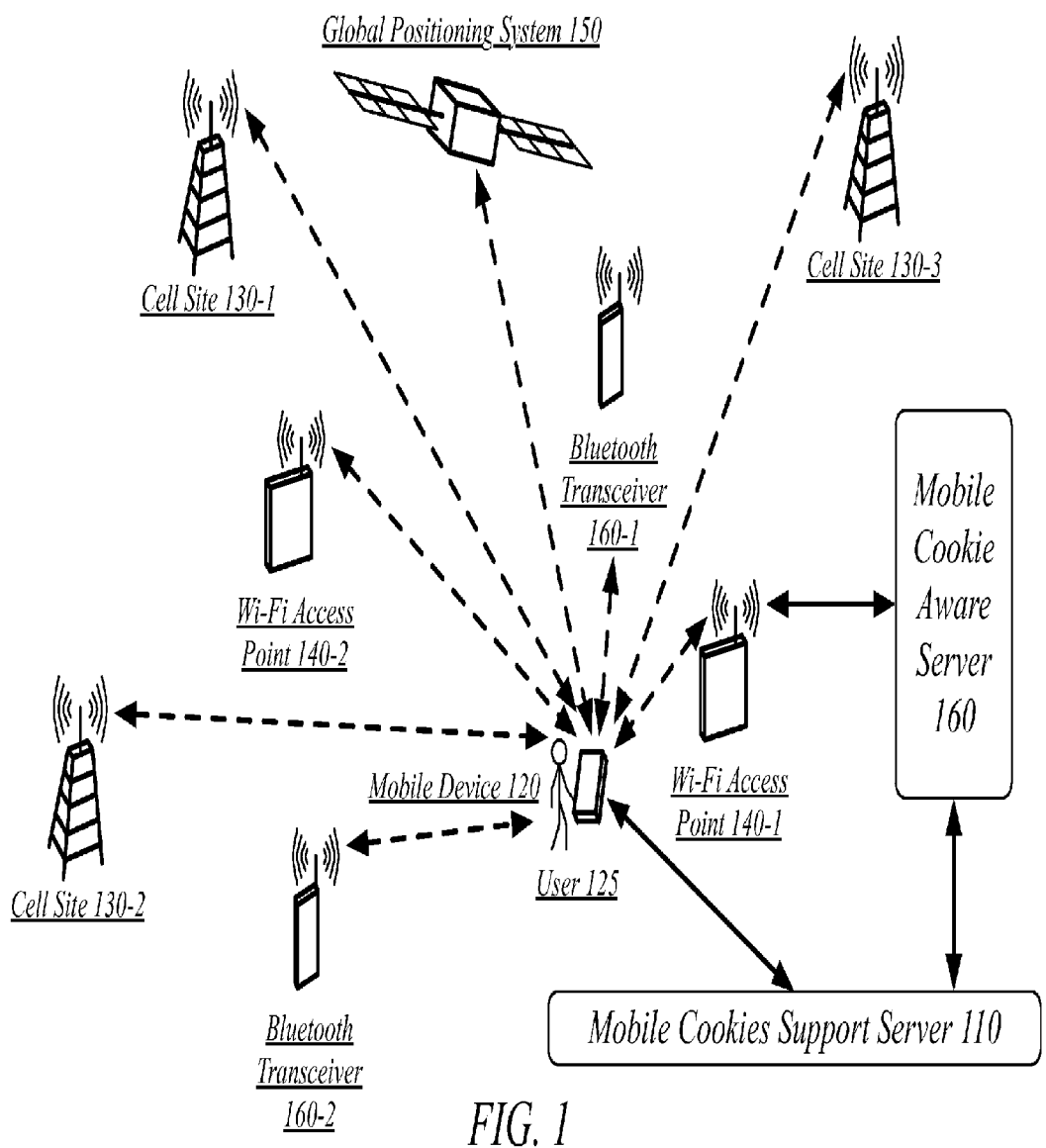
FIG. 1 illustrates an operating environment for a mobile cookies system.

Various embodiments are directed to a user data repository associated with a mobile device for a user. A user may carry a mobile device, such as a smartphone, portable digital. assistant, portable music player, or other portable computing device. This mobile device may include software and hardware for accessing computer networks, including wireless computer networks such as Wi-Fi, Bluetooth, cellular, or other networks using radio transmissions. These wireless networking technologies may be used by the mobile device to identify its location and other wireless devices in its area. Similarly, these wireless networking technologies may be used by other wireless devices in the area to identify the mobile device.

Computing-based services and other services which leverage computing and networking technology may use information stored about a user to improve their services. User preferences may be stored that are used to customize the service. For example, user information may include media preferences for a user, with music provided by an online (e.g., website) or in-person service (e.g., hotel, bar) customized to the user according to the stored media preferences. Information about a user device may be used to configure the user device, such as a mobile device, for interaction with the service. For example, the network settings of a device may be configured for use with a wireless service provided, such as Wi-Fi provided by a hotel. That a user has visited a physical geographic location may be used to configure an online component of a service. For example, a website, email, or other online contact with a user may include location-specific promotions relevant to a geographic location visited by the user.

A user's mobile device may serve as any and all of a tool for detecting the presence of a user at a geographic location, a tool for a user to communicate their presence at a geographic location, an endpoint for communicating location-relevant information to a user, and a repository for storing user information. Because a mobile device is often kept in the physical presence of a user, detecting the presence of a particular mobile device associated with the user may be used a proxy for determining that the user is present. Similarly, the mobile device detecting that it is at a particular location may serve as a proxy for the mobile device determine that the user is present at the location. Because users may frequently use their mobile device for network tasks, may keep their mobile device in the presence, and because the presence of a mobile device may have been the indicator that a user is present, the mobile device may be valuable for communicating with a user. Because user information may be generated, customized, and/or prompted for storage based upon the presence and/or identification of a mobile device, the mobile device may be a convenient location for storing user information. As a result, leveraging a mobile device for determining to generate user information, customizing user information, and customizing a service may be improve the services provided to a user.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a mobile cookies system 100. In one embodiment, the mobile cookies system 100 may comprise a computer-implemented system. Although the mobile cookies system 100 shown in FIG. 1 has a limited number of elements in a certain topology, it may be appreciated that the mobile cookies system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122 may include components 122-1, 122-2, 122-3, 122-4 and 122-5. The embodiments are not limited in this context.

The mobile cookies system 100 may comprise a mobile cookies support server 110 working in coordination with a mobile device 120 to provide a user 125 access to location-based services in a manner that limits the power used in providing location updates to the location-based services to that necessary to meet the timeliness and accuracy needs of the location-based services. In some embodiments, a particular mobile cookies support server 110 may coordinate the activities of a plurality of mobile devices used by a plurality of users. In some embodiments, a plurality of a client location monitoring servers may exist within the mobile cookies system 100, with each one coordinating a plurality of mobile devices.

A mobile device 120 may have access to a plurality of systems by which it can determine its location. For example, a mobile device 120 may be able to detect signals from a global positioning system 150 using a GPS receiver. The GPS receiver, based on the signals from the global positioning system 150, may be able to detect the geographic location of a mobile device 120 with a high degree of accuracy, to within a few feet, particularly when the GPS receiver has an unobstructed line-of-sight to the global positioning system 150, such as when outdoors. However, the GPS receiver may not be able to determine the location of the mobile device 120 in some circumstances, particularly where the mobile device 120 is in some indoor environments. Further, using the GPS receiver may result in a higher power expenditure due to the lower perceived signal strength of GPS signals by the time they reach the mobile device 120, which may be undesirable for frequently monitoring the location of a device, as may be desired for tracking when a device enters geographic locations associated with various services.

The mobile device 120 may be able to detect signals from one or more cell sites 130. A mobile device 120 being able to detect signals from a particular cell site provides information as to the location of the mobile device 120. The cellular signals from a cell site have a limited range, which may be the consequence of the cell site's broadcast strength, local geography (both natural and human-made), and other factors. The ability of a particular mobile device 120 to detect a cell site may be influenced by the reception ability of the mobile device 120. Similarities between the reception capabilities of various mobile devices may allow for a geographic area to be associated with each cell site, with the geographic areas associated with various cell sites communicated to the mobile device 120 from a central repository. These geographic areas may be determined according to calculations based on a cell site's broadcast strength, local geography, and other factors. These geographic areas may be determined according to sampling of which areas a cell site's transmissions may be detected at. A combination of these techniques may be used. Where a mobile device 120 can detect multiple cell sites, it may be able to refine its location to be within the area in which the geographic areas associated with the detectable cell sites overlap.

Detecting one or more cell sites 130 may use a cellular radio device (e.g., cellular receiver, cellular transceiver) on the mobile device 120. The location determined using one or more cell sites 130 may be less accurate than if the global positioning system 150 were used, particularly where few or only one cell site is detected. However, cell-site triangulation may function in some environments in which Wi-Fi is not available and/or where GPS signals cannot penetrate. Further, using the cellular radio device may use less power than using the GPS receiver on the mobile device 120 and may be performed simultaneously with the cellular radio device being used for network access via a cellular network, thereby reducing the additional power devoted to determining the location of the mobile device 120. Thus, cellular triangulation may be appropriate for frequently monitoring the location of a device, as may be desired for tracking when a device enters geographic locations associated with various services.

The mobile device 120 may be able to detect signals from one or more Wi-Fi access points 140. A mobile device 120 being able to detect signals from a particular Wi-Fi access point provides information as to the location of the mobile device 120. The Wi-Fi signals from a Wi-Fi access point have a limited range, which may be the consequence of the Wi-Fi access point's broadcast strength, local geography (both natural and human-made), and other factors. The ability of a particular mobile device 120 to detect a Wi-Fi access point may be influenced by the reception ability of the mobile device 120. Similarities between the reception capabilities of various mobile devices may allow for a geographic area to be associated with each Wi-Fi access point, with the geographic areas associated with various Wi-Fi access points communicated to the mobile device 120 from a central repository. These geographic areas may be determined according to calculations based on a Wi-Fi access point's broadcast strength, local geography, and other factors. These geographic areas may be determined according to sampling of which areas a Wi-Fi access point's transmissions may be detected at. A combination of these techniques may be used. Where a mobile device 120 can detect multiple Wi-Fi access points, it may be able to refine its location to be within the area in which the geographic areas associated with the detectable Wi-Fi access points overlap.

Detecting one or more Wi-Fi access points 140 may use a Wi-Fi radio device (e.g., Wi-Fi receiver, Wi-Fi transceiver) on the mobile device 120. Using the Wi-Fi radio device may use less power than using the GPS receiver on the mobile device 120 and may be performed simultaneously with the Wi-Fi radio device being used for network access via a Wi-Fi network, thereby reducing the additional power devoted to persistently tracking the location of the mobile device 120. However, the location determined using one or more Wi-Fi access points 140 may be less accurate than if the global positioning system 150 were used, particularly where few or only one Wi-Fi access point is detected. As such, using Wi-Fi triangulation instead of GPS positioning may represent a tradeoff in which lower accuracy is accepted in return for lower power usage. Using Wi-Fi triangulation may use less power and result in higher accuracy than using cellular triangulation, but may not be possible in areas without Wi-Fi access point or where Wi-Fi access points have not been registered with associated geographic areas with a repository known to the mobile device 120.

The mobile device 120 may be able to detect signals from one or more Bluetooth transceivers 160. In various embodiments, other short-range networking technologies may also or alternatively be used. A mobile device 120 being able to detect signals from a particular Bluetooth transceiver provides information as to the location of the mobile device 120. The Bluetooth signals from a Bluetooth transceiver have a limited range, which may be the consequence of the Bluetooth transceiver's broadcast strength, local geography (both natural and human-made), and other factors. The ability of a particular mobile device 120 to detect a Bluetooth transceiver may be influenced by the reception ability of the mobile device 120. Similarities between the reception capabilities of various mobile devices may allow for a geographic area to be associated with each Bluetooth transceiver, with the geographic areas associated with various Bluetooth transceivers communicated to the mobile device 120 from a central repository. These geographic areas may be determined according to calculations based on a Bluetooth transceiver's broadcast strength, local geography, and other factors. These geographic areas may be determined according to sampling of which areas a Bluetooth transceiver's transmissions may be detected at. A combination of these techniques may be used. Where a mobile device 120 can detect multiple Bluetooth transceivers, it may be able to refine its location to be within the area in which the geographic areas associated with the detectable Bluetooth transceivers overlap.

Detecting one or more Bluetooth transceivers 160 may use a Bluetooth radio device (e.g., Bluetooth receiver, Bluetooth transceiver) on the mobile device 120. Using the Bluetooth radio device may use less power than using the GPS receiver, cellular transceiver, or Wi-Fi transceiver on the mobile device 120. However, the location determined using one or more Bluetooth transceivers 160 may be less accurate than if the global positioning system 150 were used, particularly where few or only one Bluetooth transceiver is detected. As such, using Bluetooth triangulation instead of GPS positioning may represent a tradeoff in which lower accuracy is accepted in return for lower power usage. Using Bluetooth triangulation may use less power and result in higher accuracy than using cellular triangulation, but may not be possible in areas without a Bluetooth transceiver or where Bluetooth transceivers have not been registered with associated geographic areas with a repository known to the mobile device 120.

Further, one or more Wi-Fi access points 140 or Bluetooth transceivers 160 may be operative to detect the presence of the mobile device 120. A mobile device 120 may have a unique Wi-Fi media access control address (MAC address) and/or a unique Bluetooth MAC address. A MAC address may be broadcast by the mobile device 120 as part of network and device discovery. A Wi-Fi access point or Bluetooth transceiver may be able to perform device discovery in which it requests the MAC addresses of nearby devices, prompting mobile devices such as the mobile device 120 to broadcast their Wi-Fi MAC address, Bluetooth MAC address, or other MAC address. In any case, a Wi-Fi access point, Bluetooth transceiver, and/or other wireless transceiver may be operative to detect a wireless MAC address for a mobile device 120 in the physical vicinity of the transceiver and thereby in the location of a service associated with the transceiver. Further, by detecting and recording the MAC address for the mobile device 120, the user 125 associated with the mobile device 120 may be identified and recorded as having visited the location of the service.

The mobile device 120 may communicate with the mobile cookies support server 110 to update the mobile cookies support server 110 as to its current location, which may be determined by the mobile device 120 according to GPS-based location determination, Wi-Fi based location determination, cellular-tower-proximity-based location determination, or according to any other technique for determining the location of a mobile device. The mobile cookies support server 110 may assist in coordinating location-based network services on behalf of the mobile device 120 and/or may update other network services that leverage location information as to the location of the mobile device 120. The mobile cookies support server 110 may maintain a user information repository for use by network services. In the performance of location-based network services the location of the mobile device 120 may be used as being sufficiently equivalent to the location of the user 125 of the mobile device 120 as to customize network service results to the location of the user 125. As such, the location of the mobile device 120 and the location of the user 125 may be considered equal, equivalent, and interchangeable.

A mobile cookie aware server 160 may perform and coordinate both or either of network services and in-person services for a user 125 of the mobile device 120. The mobile cookie aware server 160 may make use of mobile cookies in the performance of these services. Mobile cookies may comprise any information stored in association with a mobile device 120, which may include any information derived from the presence of a mobile device 120 in a location, any information stored on the mobile device 120, any information used in the configuration of the mobile device 120, and generally any information leveraging the association between a mobile device 120 and a user 125 for the providing of services. Mobile cookies may be stored on a mobile device 120, may be stored on a mobile cookies support server 110, and may be replicated between the mobile device 120 and the mobile cookies support server 110.

Either or both of the mobile device 120 and mobile cookies support server 110 may interact with a mobile cookie aware server 160 to receive, store, and provide mobile cookies. The mobile cookie aware server 160 may be a network server used by a service for the providing of services leveraging network information including mobile cookies. For example, the mobile cookies aware server 160 may be used to generate cookies tracking the presence of a user 125 in a particular location. The mobile cookies aware server 160 may be used to configure a mobile device 120 on behalf of a user 125 to interact with location-specific services. The mobile cookies aware server 160 may be used to generate and retrieve mobile cookies reflecting preferences of a user 125 and to use the preferences to customize a network or in-person service to the user 125. Mobile cookies stored on the mobile cookies support server 110 may be retrieved by the mobile cookies aware server 160 directly from the mobile cookies support server 110. Mobile cookies stored on the mobile device 120 may be retrieved by the mobile cookies aware server 160 directly from the mobile device 120 or via the mobile cookies support server 110, with the mobile cookies support server 110 acting as an intermediary. Where mobile cookies are replicated across both the mobile device 120 and the mobile cookies support server 110 the mobile cookie aware server 160 may store and retrieve the mobile cookies with either or both as may depend on implementation and circumstances.

Mobile cookies system 100 may include an authorization server (or other suitable component(s)) that allows users to opt in to or opt out of having their location logged by mobile cookies system 100 or shared with other systems (e.g., third-party systems), for example, by setting appropriate privacy settings. Users may be empowered to opt in to or opt out of having mobile cookies stored on their mobile device or on a network server with reference to their mobile device. A privacy setting of a user 125 may determine what information associated with the user 125 may be logged, how information associated with the user 125 may be logged, when information associated with the user 125 may be logged, who may log information associated with the user 125, whom information associated with the user 125 may be shared with, and for what purposes information associated with the user 125 may be logged or shared. For example, privacy settings of a user 125 may specify access permissions to mobile cookies for the user 125. Authorization servers or other authorization components may be used to enforce one or more privacy settings of the users of the mobile cookies system 100 through blocking, data hashing, anonymization, or other suitable techniques as appropriate.

Figure 2:
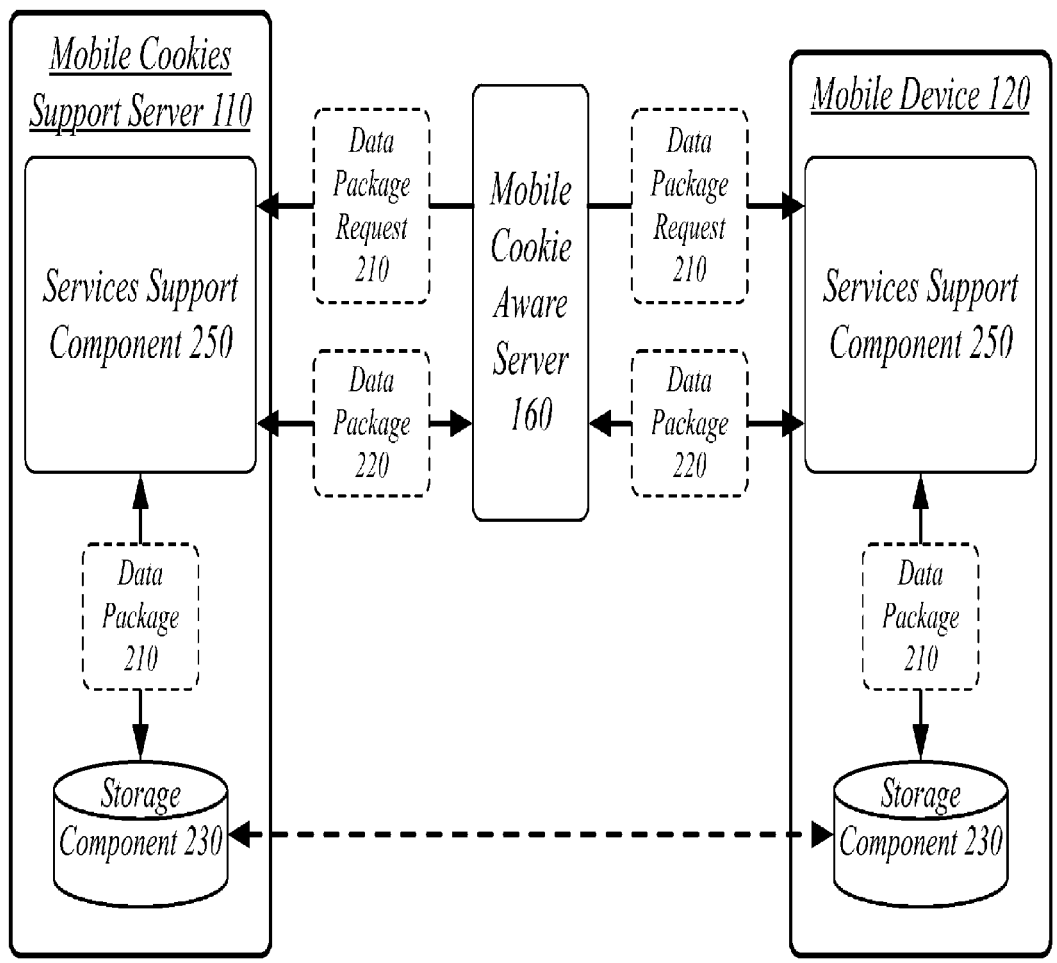
FIG. 2 illustrates an embodiment of a mobile cookies system.

FIG. 2 illustrates an embodiment of a mobile cookies system 100. As shown in FIG. 2, a mobile cookie aware server 160 interacts with a mobile device 120 and mobile cookies support server 110.

The mobile cookies support server 110 may be generally arranged to support users, mobile clients, and services in the use of mobile cookies. The mobile cookies support server 110 may act as an intermediary between the mobile device 120 and a mobile cookies aware server 160. The mobile cookies support server 110 may exchange information with either or both of the mobile device 120 and mobile cookies aware server 160 to empower them to communicate and implement mobile cookies. The mobile cookies support server 110 may comprise a services support component 250 and storage component 230. The services support component 250 may support one or more services, including a mobile cookie aware server 160 corresponding to a server for a particular service of a plurality of services.

The mobile device 120 may be generally arranged to act as a representative for the location of the user 125 and as at least one of the endpoints used by the user 125 to interact with network services. The mobile device 120 may interact with the mobile cookie aware server 160 and/or mobile cookies support server 110 to implement mobile cookies. The mobile device 120 may comprise a services support component 250 and a storage component 230. The services support component 250 may support one or more services, including a mobile cookie aware server 160 corresponding to a server for a particular service of a plurality of services.

A services support component 250 may be operative to receive a data package request 210 from a mobile cookie aware server 160, the mobile cookie aware server 160 serving as at least one network server interacting with mobile cookies on behalf of a network service. A network service may correspond to any service, operation, or organized activity performing services that include at least a network component, such as the use of mobile cookies.

The data package request may comprise a network identifier for a mobile device 120 associated with a user 125. The network identifier may comprise an identifier for the mobile device 120 on a wireless network. The network identifier may comprise a unique identifier for the wireless hardware used by the mobile device 120 in accessing a wireless network. The network identifier may comprise a media access control (MAC) address for a wireless network interface controller (NIC) of the mobile device 120.

A storage component 230 may be operative to store a mobile cookies repository comprising a plurality of data packages, wherein each data package comprises a mobile cookie. The mobile cookies repository may comprise a database, structured file, or other form of organized storage for a plurality of mobile cookies. A mobile cookie may comprise a sequence of data specified by a service and stored in association with that service. The storage component 230 may be operative to access the data package 210 associated with the user based on the network identifier. The storage component 230 may store a plurality of mobile cookies associated, wherein various subsets of the plurality of mobile cookies are uniquely associated with different mobile devices and/or different users. The storage component 230 may identify the mobile cookies for a particular mobile device and/or user based on the network identifier for the mobile device 120 associated with the user 125. The storage component 230 may perform a database lookup, index search, or use any other form of retrieval technique to identify one or more mobile cookies associated with a particular network identifier.

The storage component 230 may store a plurality of data packages associated with each user, each of the data packages comprising a mobile cookie associated with a particular service. For a particular user, the storage component 230 may store a plurality of data packages each comprise a mobile cookie associated with a particular service. Each service may correspond to a service identifier, which may be represented as a unique numerical identifier, a uniform resource locator (URL) associated with the service, a secure token, or any other technique for uniquely identifying a service. The data package request 210 may comprise a service identifier associated with the service implemented at least in part by the mobile cookie aware server 160. The storage component may be operative to identify a plurality of mobile cookies associated with the user based on the network identifier and access a particular data package corresponding to the service from the plurality of data packages based on the service identifier.

In some embodiments, the wireless identifier may be translated into a user identifier prior to accessing a data package from the storage component 230, with the identifying of the data package being based on the network identifier but being directly performed as a lookup using the user identifier. The storage component 230 may store a translation table between network identifiers and user identifiers. The services support component 250 may be operative to use the translation table to uniquely identify users to services and to use the translation table to retrieve user-specific mobile cookies based on user identifier after translation from a wireless identifier.

In some embodiments, the user identifier for a user 125 may be determined based on the presence of the user 125 in the geographic location without the use of a wireless identifier for the mobile device 120. The location of the mobile device 120 may be determined according to the global position system 150, cellular triangulation, Wi-Fi triangulation, or any other technique for location detection by a mobile device 120. The mobile device 120 may report its location to the mobile cookies support server 110 or to the mobile cookie aware server 160 along with the user identifier for the user 125. The mobile cookie aware server 160 may perform the data package request 210 using the user identifier and exchange the data package 220 based on the user identifier in response to the determination that the user 125 is present based on the local detection performed by the mobile device 120.

The services support component 250 may be operative to exchange the data package 220 with the mobile cookies aware server 160 representing the service in response to the data package request 210. In some cases, the mobile cookie aware server 160 may generate a mobile cookie comprising the data package 220 and transmit the data package 220 to the services support component 250 for storage in the storage component 230, the data request 210 comprising a request to store a mobile cookie. In some cases, the mobile cookie aware server 160 may retrieve a previously-generated mobile cookie comprising the data package 220 and receive the data package 220 from the services support component 250 after its retrieval from the storage component 230, the data request 210 comprising a request to receive a mobile cookie associated with the service.

The mobile cookie aware server 160 may be associated with one or more wireless transceivers, such as one or more of Wi-Fi access points 140 or one or more of Bluetooth transceivers 160. The wireless transceivers may be operative to scan the area within range of their wireless receiver, which may comprise scanning among all of the radio frequencies associated with the protocol to which they conform. Wireless scanning may produce a list of a plurality of wireless identifiers corresponding to a plurality of mobile devices. Mobile cookie aware server 160 may be operative to perform various tasks for some or all of the plurality of wireless identifiers detected. These tasks may include generating mobile cookies representing visit records for the detected devices, requesting configuration preferences of the users associated with the detected devices, generating configuration packages for the detected devices, any other technique associated with mobile cookies, and any combination of techniques associated with mobile cookies.

The mobile cookie aware server 160 may receive one or more wireless identifiers from one or more wireless transceivers of mobile devices detected in their vicinity. The detection of these one or more wireless identifiers may serve as a detection of the mobile devices as being in the vicinity of the wireless transceivers. As the wireless transceivers may be associated with a particular geographic area associated with the service implemented at least in part by the mobile cookie aware server 160, the detection of the mobile devices as being in the vicinity of the wireless transceivers may indicate that the mobile devices are in a geographic location associated with the service. As the location of the mobile devices may be used as a proxy for the location of the associated users of the mobile devices, the detection of the mobile devices may correspond to the detection of one or more users as being present in the geographic location associated with the service. As such, the mobile cookie aware server 160 may be operative to receive a list of one or more wireless identifiers detected via wireless scanning, the list of one or more wireless identifiers indicating the presence of one ore more associated users as being present in a geographic location associated with the service implemented at least in part by the mobile cookie aware server 160.

As shown in FIG. 2, a services support component 250 and a storage component 230 may reside on either or both of a mobile cookies support server 110 and a mobile device 120. In some cases, the mobile cookie aware server 160 may perform a data package request 210 with a services support component 250 on the mobile device 120 and exchange the data package 210 with the services support component 250 on the mobile device 120. In other cases, the mobile cookie aware server 160 may perform a data package request 210 with a services support component 250 on the mobile cookies support server 110 and exchange the data package 210 with the services support component 250 on the mobile cookies support server 110.

The mobile cookies for a user may be replicated across a storage component 230 on the mobile device 120 and a storage component 230 on the mobile cookies support server 110. In some embodiments, a storage component 230 on the mobile cookies support server 110 may store mobile cookies for a plurality of users while the storage component 230 stores those and only those cookies associated with a user 125 of the mobile device 120. As such, the storage component 230 on the mobile cookies support server 110 may contain a replication of mobile cookies for a plurality of users on a plurality of mobile devices, where the storage components on the mobile devices contain a replication of mobile cookies specific to their particular users. The services support component 250 on the mobile device 120 and the services support component 250 on the mobile cookies support server 110 may be operative to perform mobile cookies replication between the mobile device 120 and the mobile cookies support server 110 according to known data replication techniques.

The mobile cookies stored in the storage component 230 on the mobile device 120 may be accessible to a local application on the mobile device 120. The local applications on the mobile device 120 may include, for example, a web browser. The web browser may be operative to use the mobile cookies in the storage component 230 on the mobile device 120 as web cookies as used for hypertext transport protocol (HTTP) web transactions. For example, the web browser may access a web page using cookies and access one of the mobile cookies in the storage component 230 as a cookie for the web page.

The storage component 230 on the mobile cookies support server 110 may be accessible to network applications implementing network services. The network applications may be executed on a same device as the mobile cookies support server 110 or on separate devices. Network applications may perform tasks on behalf of users and request and store the mobile cookies in the storage component 230 of the mobile cookies support server 110 in the implementation of their services. For example, a network application performing as a web server may retrieve mobile cookies from the storage component 230 of the mobile cookies support server 110 as part of serving a web page to a user 125 of the mobile device 120.

Figure 3:
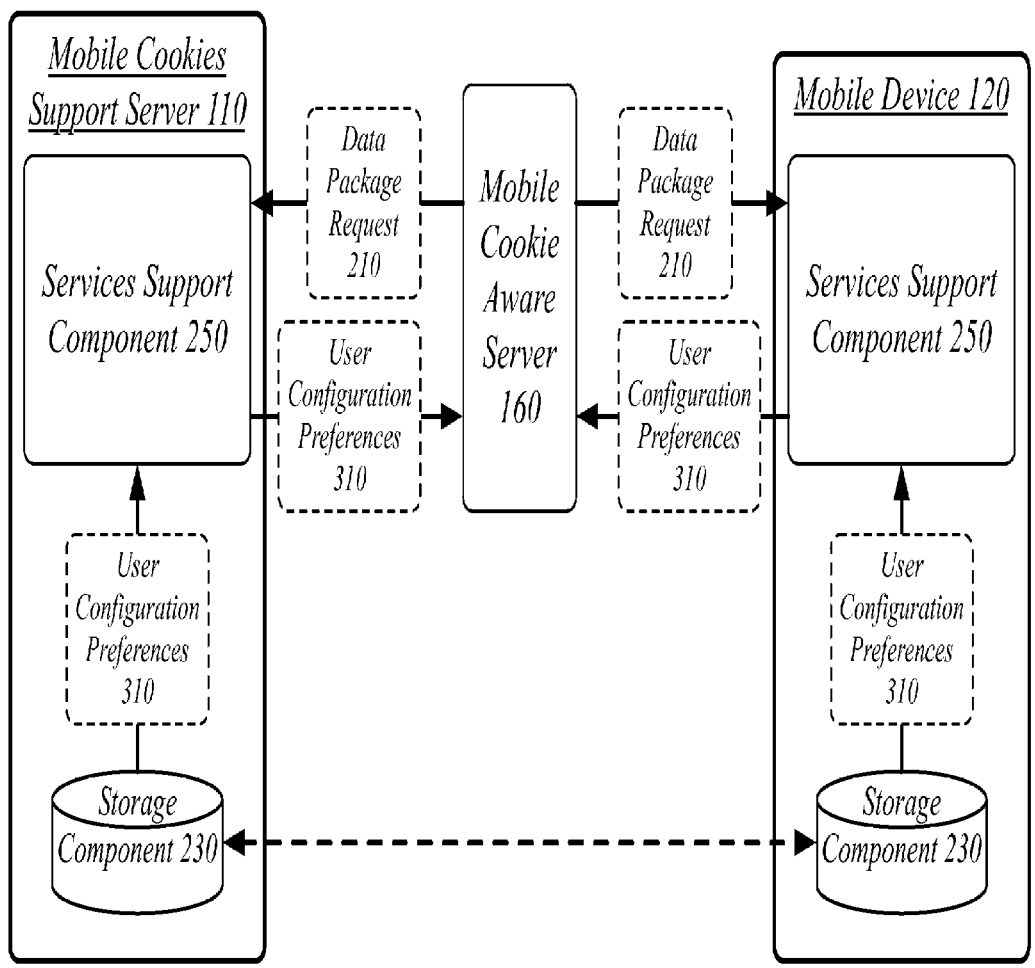
FIG. 3 illustrates user configuration preferences for a user being transmitted to a mobile cookie aware server.

FIG. 3 illustrates user configuration preferences 310 for a user being transmitted to a mobile cookie aware server 160. As shown in FIG. 3, the user configuration preferences 310 may be received from either of the mobile cookies support server 110 or the mobile device 120.

The user configuration preferences 310 may comprise at least a portion of the mobile cookies associated with a user 125 and a service. The user configuration preferences 310 may be associated with the service performed at least in part by the mobile cookie aware server 160. The user configuration preferences 310 may be transmitted to the mobile cookie aware server 160 in response to the data package request 210. The user configuration preferences 310 may be stored in the storage component 230 in response to a request by the mobile cookie aware server 160.

The mobile cookie aware server 160 may customize an in-person physical service to the user 125 based on the user configuration preferences 310. For example, the mobile cookie aware server 160 may be operative to control elements of a hotel room, such as thermostat settings, lighting settings, television settings, music settings, alarm clock settings, and any other element of an accommodation and to specific one or more of those elements based on the user configuration preferences 310. For instance, the user configuration preferences 310 may indicate that a user prefers that a hotel room thermostat be set to 74° and may set the thermostat to 74° in response to reading this indication from the received user configuration preferences 310.

In another example, the mobile cookie aware server 160 may be operative to control elements of a public accommodation, such as a bar, restaurant, or other public space. The mobile cookie aware server 160 may be operative to specify settings for thermostats, lighting, music, television, or any other element of the accommodation based on individual or collective preferences of the known users present in the accommodation. For instance, music playback may be selected to vary among the preferences of those present or to jointly accommodate the preferences of those present based on selections acceptable to all those known to be present. It will be appreciated that, in general, any element of any physical location subject to computerized control may be configured at least in part based user configuration preferences 310 for a user 125.

The mobile cookie aware server 160 may customize a network service to the user 125 based on the user configuration preferences 310. For example, the layout or content of a website may be adjusted based on the user configuration preferences 310. The content of a streaming service may be determined based on the user configuration preferences 310. In general, any aspect of a network service may be customized based on the user configuration preferences 310.

Figure 4:
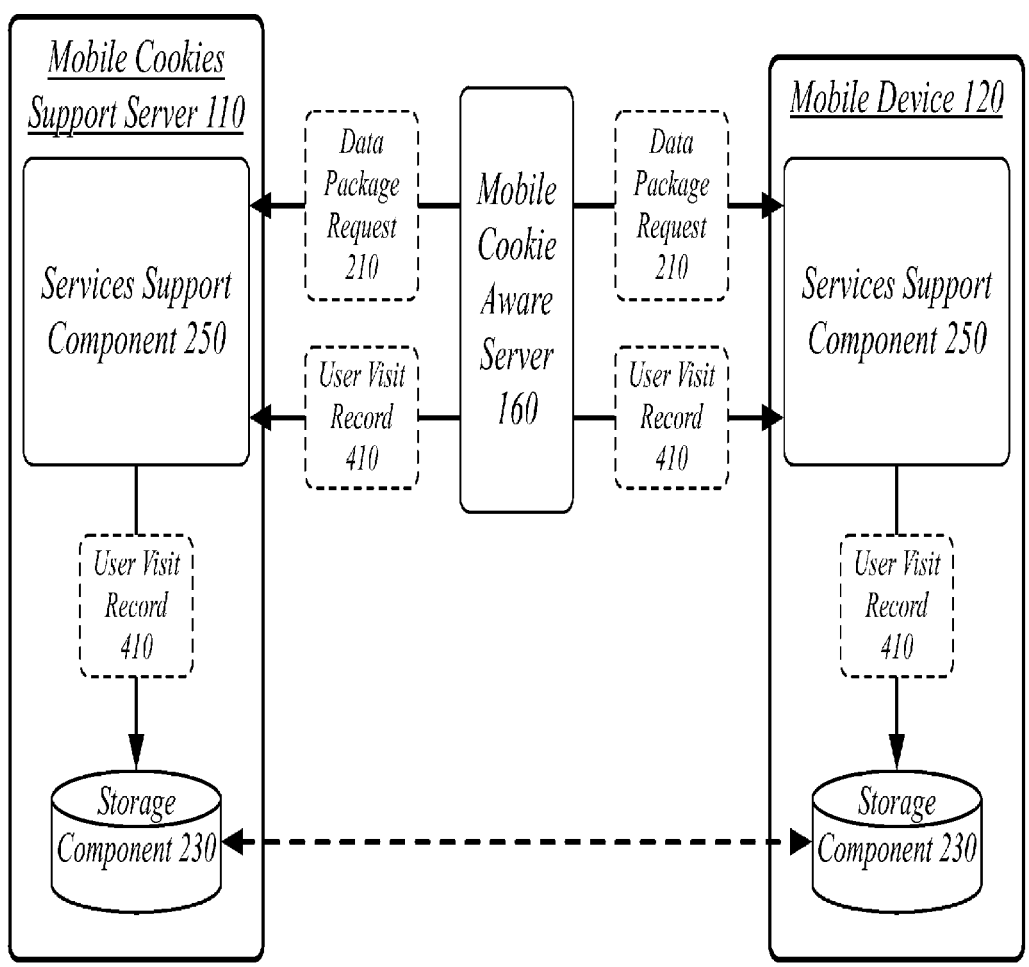
FIG. 4 illustrates a user visit record being received for storage from a mobile cookie aware server.

FIG. 4 illustrates a user visit record 410 being received for storage from a mobile cookie aware server 160. As shown in FIG. 4, the user visit record 410 may be transmitted to either of the mobile cookies support server 110 or the mobile device 120.

The user visit record 410 may comprise at least a portion of the mobile cookies associated with a user 125 and a service. The user visit record 410 may record the presence of a user 125 at a particular geographic location associated with the service implemented at least in part by the mobile cookie aware server 160. The user visit record 410 may be stored to customize or otherwise configure future services based on the knowledge of the user's previous visit to the geographic location.

The user visit record 410 may include additional information related to the user's visit to the geographic location. The user visit record 410 may comprise a particular location, such as where the service is associated with multiple geographic location (e.g., a department store with a plurality of physical outlets). The user visit record 410 may comprise a time of the visit, including both a day and time-of-day, or generally corresponding to any technique for representing a particular time. The user visit record 410 may include a record of some or all of the activities performed by the user 125 at the physical location, such as the purchase of items, the reception of services, or any other services that may be associated with physical activity at the geographic location.

The user visit record 410 may be later retrieved by the same mobile cookie aware server 160 or a different mobile cookie aware server associated with the service, the user visit record 410 transmitted to the service by the services support component 250. The user visit record 410 may be used to modify future in-person services or network services in response to the record of the user 125 having visited the geographic location. For example, a web visit by the user 125 to a web page for the service may reflect the visit by the user 125 to the physical location of the service. The user 125 may be offered promotions related to the particular physical location visited by the user 125. The user 125 may be offered the opportunity to make purchases online that may be picked up or performed in person, with the physical location visited most recently or most often by the user 125 offered as a default location for the retrieval or performance of these services. Similarly, a web interface for the purchase of physical goods or services may display their availability, with the availability at the location indicated by the user visit record 410 being displayed or being displayed with a higher prominence than for other locations. In general, any information stored in the user visit record 410 may be used in the customization of network services to the user 125. In general, the user visit record 410 may be used to customize in-person services, such as described with reference to user configuration preferences 310. For example, a user visit record 410 may record a user's specification of device settings (e.g., thermostat settings), with those settings used as user configuration preferences 310 for those devices upon a user's return that location or another location offering similar customizability (e.g., a different hotel room).

Figure 5:
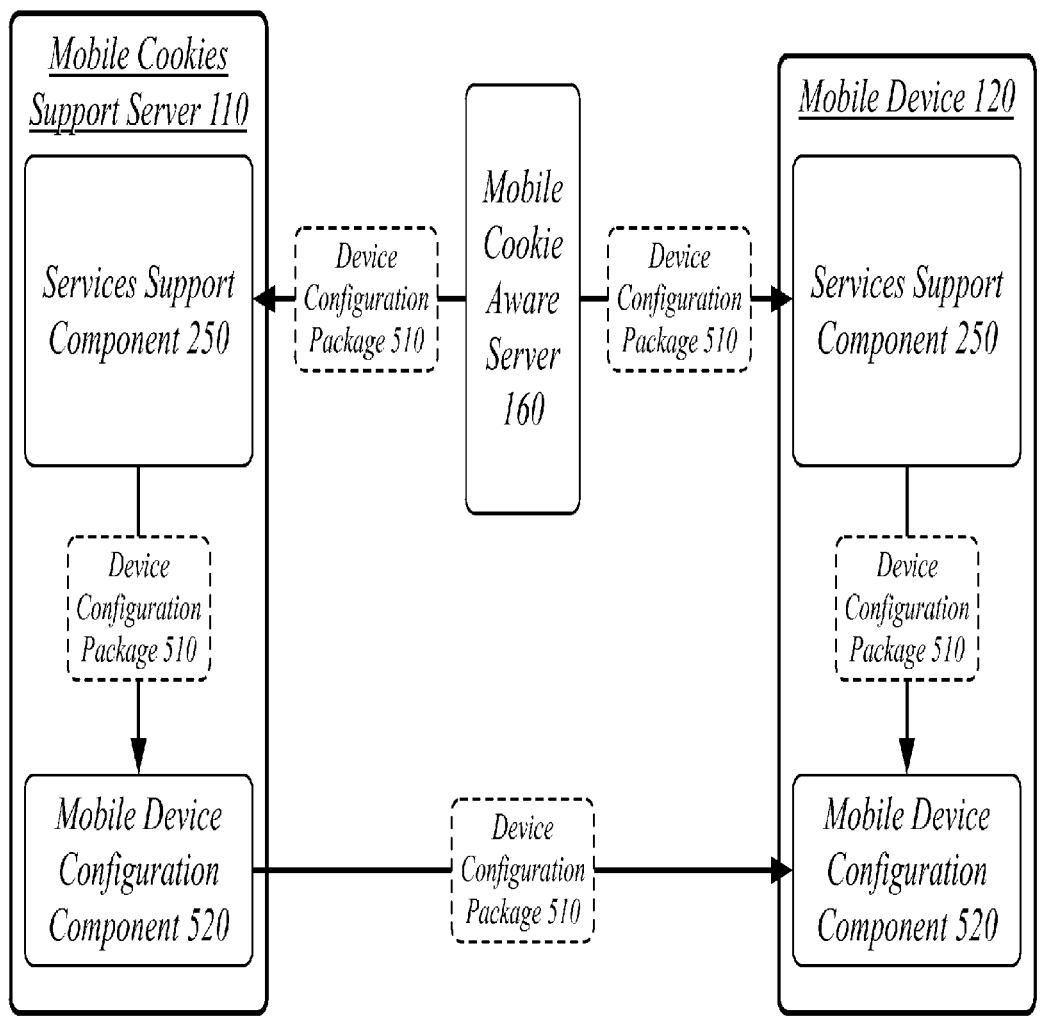
FIG. 5 illustrates a mobile device configuration being received from a mobile cookie aware server.

FIG. 5 illustrates a mobile device configuration 510 being received from a mobile cookie aware server 160. As shown in FIG. 5, the mobile device configuration 510 may be transmitted directly to the mobile device 120 or via the mobile cookies support server 110.

The services support component 250 may be operative to receive a device configuration package 510 from the mobile cookie aware server 160, the device configuration package 510 specifying device configuration information for the configuration of the mobile device 120 associated with the user 125. The services support component 250 may be operative to pass the device configuration package 510 to a mobile device configuration component 520 for configuration of the mobile device 120.

A mobile device configuration component 520 may be operative to receive a device confirmation package 510, receive a device configuration package 510 from the mobile cookie aware server 160, the device configuration package 510 specifying device configuration information for the configuration of the mobile device 120. The mobile configuration component may be operative to configure the mobile device 120 according to the device configuration information.

In some cases, the device configuration package 510 may be received from the mobile cookie aware server 160 by the mobile cookies support server 110. Where the device configuration package 510 is received on the mobile cookies support server 110, a mobile device configuration component 520 on the mobile cookies support server 110 may be operative to configure the mobile device 120 using the device configuration package 510 by transmitting the device configuration package 510 to a mobile device configuration component 520 on the mobile device 120. As such, the mobile cookies support server 110 may operate as an intermediary between the mobile cookie aware server 160 and the mobile device 120 for the configuration of the mobile device 120.

In some cases, the device configuration package 510 may be directly received from the mobile cookie aware server 160 by the mobile device 120 without the mobile cookies support server 110 being used as an intermediary. In either case, upon receiving the device configuration package 510, the mobile device configuration component 520 may be operative to configure the mobile device 120 according the device configuration information of the device configuration package 510.

The device configuration package 510 may provide device configuration information for the configuration of any element of the mobile device 120. The device configuration information may relate to the configuration of any software or hardware element of the mobile device 120.

The device configuration information may empower the mobile device configuration component 520 to configure the mobile device 120 to interoperate with the service. The device configuration information 510 may specifying device configuration information empowering the mobile device configuration component 520 to configure the mobile device 120 to interoperate with the mobile cookie aware server 160, some other element of the service, or both the mobile cookie aware server 160 and other elements of the service.

In some cases, the device configuration information may empower the mobile device configuration component 520 to configure the mobile device 120 to access a wireless network associated with the service. For example, the service may provide Wi-Fi or other wireless network service at a geographic location associated with the service (e.g., free Wi-Fi in a hotel, coffee shop, etc.). The mobile device 120 may need to be configured to access the wireless network service, such as through the selection of a particular wireless network and the exchange of security information (e.g., a password) in order to join the wireless network. The device configuration package 510 may therefore include a wireless network to be joined and the security information to be used in joining the wireless network.

As such, a user 125 may be able to enter a geographic location with their mobile device 120 and have the mobile cookies support server 110 act as an intermediary for the configuration of the mobile device 120 to join a wireless network provided by a service associated with the geographic location. The mobile cookie aware server 160 may receive a wireless identifier for the mobile device 120 detected by a wireless access point performing wireless scanning. The mobile cookie aware server 160 may indicate to the services support component 250 of the mobile cookies support server 110 that a mobile device 120 with that wireless identifier entered the geographic location associated with the service. The mobile cookie aware server 160 may at that time transmit device configuration package 510 to the mobile cookies support server 510 or may have previously transmitted the device configuration package 510 to the mobile cookies support server 510 with the mobile cookies support server 510 storing the device configuration package 510 for future use in configuring mobile devices such as mobile device 120.

The mobile cookies support server 110 may transmit the device configuration package 510 to the mobile device 120 for configuration of the mobile device 120. The mobile cookies support server 110 may contact the mobile device 120 using a network address registered with the mobile cookies support server 510 by the mobile device 120, such as part of a persistent or semi-persistent connection being maintained between the mobile device 120 and the mobile cookies support server 510 or another services associated with the mobile cookies support server 510. For example, the mobile device 120 may maintain a semi-persistent network connection with a network service used by user 125 of the mobile device 120 for the periodic reception of relevant data (e.g., email, social networking information, messaging, etc.). The mobile cookies support server 110 may operate in conjunction with the network service to push the device configuration package 510 to the mobile device 120.

The mobile device 120 may receive the device configuration package 510 from the mobile cookies support server 110, the device configuration package 510 trusted by the mobile device 120 and the user 125 of the mobile device 120 because of the preexisting relationship between the user 125 and the network service used by the user 125. The user 125 may therefore trust the mobile cookies support server 110 to provide a device configuration package 510 for automatic configuration of the mobile device 120. Alternatively, the user 125 may be presented with a user interface dialog presenting the option of performing the configuration.

The mobile device 120 may then be configured using the device configuration information of the device configuration package 510. The mobile device 120 may be configured to access the wireless network provided by the service and therefore be configured to interoperate with the service. The mobile device 102 may further be configured to directly provide additional information to the service, such as via the mobile cookie aware server 160. For instance, the device configuration package 510 may be delivered to the mobile device 120 via the mobile cookies support server 110, with user configuration preferences, or any other mobile cookies, transmitted to the mobile cookie aware server 160 via the wireless network of the service configured using the device configuration information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive a data package request 210 from a service, the data package request 210 comprising a network identifier for a mobile device 120 associated with a user 125, the data package request 210 comprising a service identifier associated with the service at block 602. The data package request 210 may be received in response to the mobile device 120 associated with the user 125 being detected as present in a geographic location associated with the service based on a detection of the network identifier for the mobile device 120. The network identifier may comprise a MAC address for a wireless MC of the mobile device 120.

The logic flow 600 may identify a plurality of data packages associated with the user 125 based on the network identifier at block 604. Each of the plurality of identified data packages may be associated with a particular service, with all of the plurality of identified data packages being associated with the user 125.

The logic flow 600 may identify a data package 220 of the plurality of data packages based on the service identifier at block 606. The data package 220 may be a data package of a plurality of data packages uniquely associated with both the user 125 and a particular service.

The logic flow 600 may transmit the data package 220 to the service in response to the data package request 210 at block 608. The data package 220 may comprise one or more user configuration preferences 310 associated with the service. The data package 220 may comprise a user visit record 410, the user visit record 410 received from the service based on a detection by the service of the network identifier in a geographic location associated with the service. The data package 220 may comprise a device configuration package 510, the configuration package specifying configuration information for the mobile device 120, the mobile device 120 identified for reception of the device configuration package 510 based on the network identifier. The device configuration information may be used to configure the mobile device 120 to interoperate with the service.

The embodiments are not limited to this example.

Figure 7:
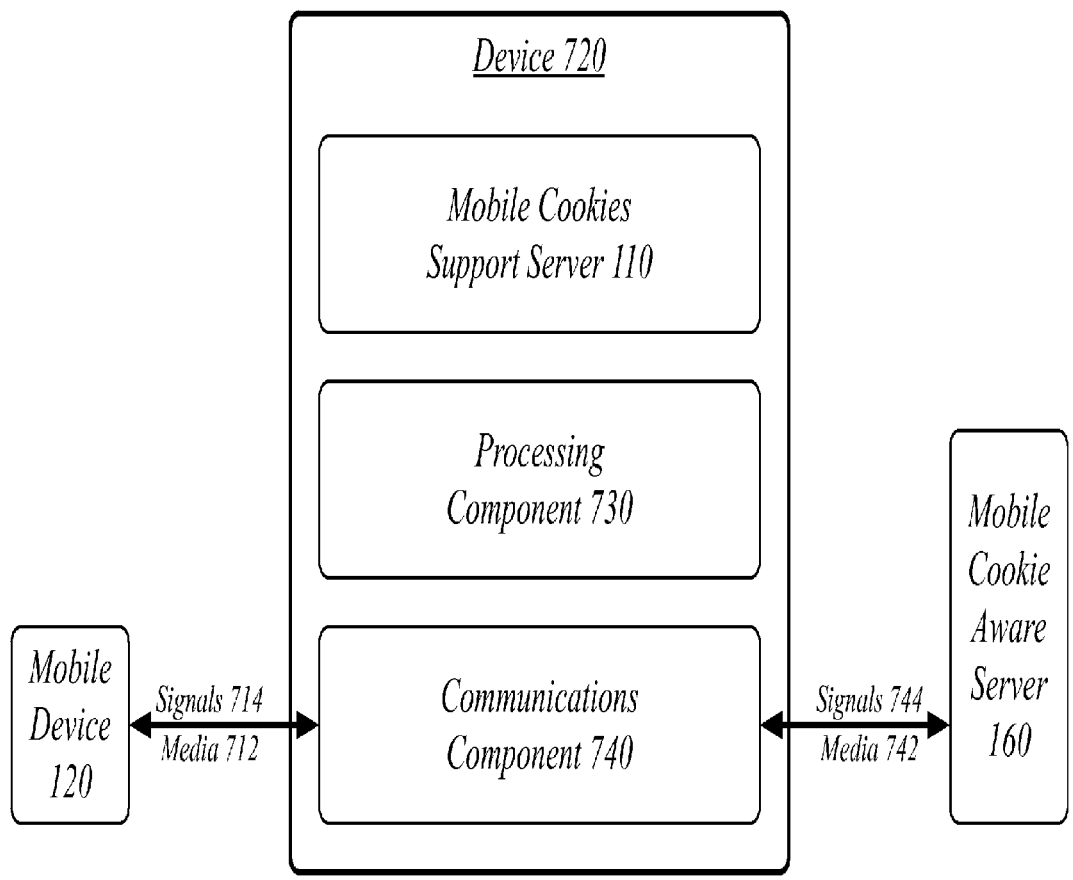
FIG. 7 illustrates an embodiment of a centralized system for the system of FIG. 1.

FIG. 7 illustrates a block diagram of a centralized system 700. The centralized system 700 may implement some or all of the structure and/or operations for the mobile cookies system 100 in a single computing entity, such as entirely within a single device 720.

The device 720 may comprise any electronic device capable of receiving, processing, and sending information for the mobile cookies system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 720 may execute processing operations or logic for the mobile cookies system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 720 may execute communications operations or logic for the mobile cookies system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with other devices over a communications media 712, 742 using communications signals 714, 744, respectively, via the communications component 740. The other devices may be internal or external to the device 720 as desired for a given implementation. Signals 714 sent over media 712 may comprise communication between the mobile cookies support server 110 and the mobile device 120 of a user 125. Signals 714 may correspond to interaction between the mobile device 120 and the mobile cookies support server 110 for the performance of mobile cookies, including mobile cookie replication, the transmission of location information, and the transmission of device configuration information. Signals 744 sent over media 742 may comprise communication between the mobile cookies support server 110 and the mobile cookie aware server 160 for a service. Signals 744 may correspond to interaction between the mobile cookies support server 110 and the service, such as for the transmission of data packages comprising mobile cookies, the exchange of network identifiers translatable to user identifiers, and the transmission of device configuration information.

Figure 8:
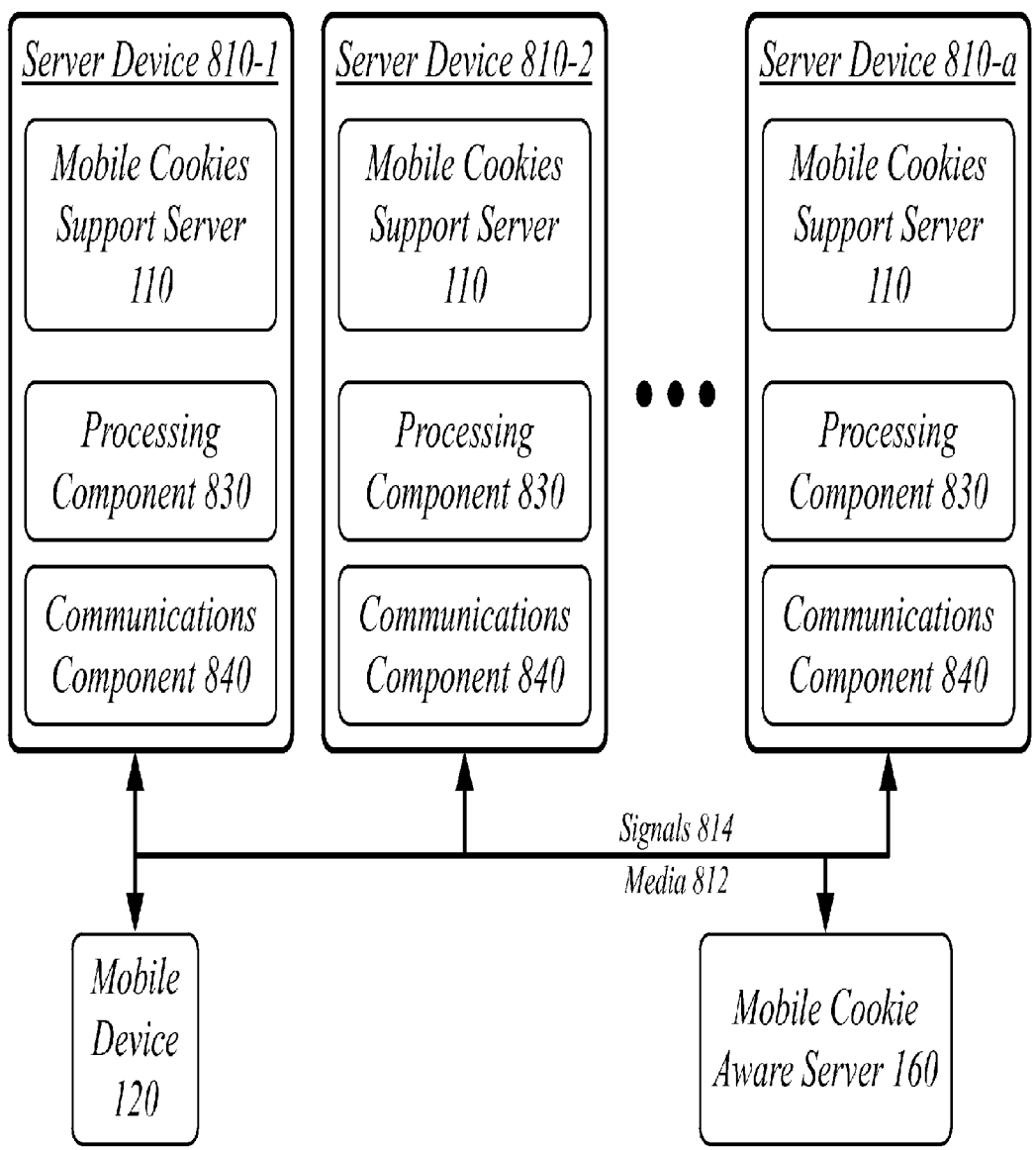
FIG. 8 illustrates an embodiment of a distributed system for the system of FIG. 1.

FIG. 8 illustrates a block diagram of a distributed system 800. The distributed system 800 may distribute portions of the structure and/or operations for the mobile cookies system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 810. In general, the server devices 810 may be the same or similar to the device 720 as described with reference to FIG. 7. For instance, the server devices 810 may each comprise a processing component 830 and a communications component 840 which are the same or similar to the processing component 830 and the communications component 840, respectively, as described with reference to FIG. 7. En another example, the server devices 810 may communicate over a communications media 812 using communications signals 814 via the communications components 840.

The server devices 810 may comprise or employ one or more client programs that operate to perform various methodologies in accordance with the described embodiments. In one embodiment, for example, each of the server devices 810 may implement a mobile cookies support server 110 performing the described operations. The server devices 810 may each implement a mobile cookies support server 110 in parallel, with various mobile devices and/or services assigned to a particular server device of the plurality of server devices 810. For example, mobile device 120 may be assigned to a server device 8104, with all mobile cookie aware servers such as mobile cookie aware server 160 being directed to server device 810-1 for interactions with mobile device 120. Alternatively, mobile devices may not be assigned to a particular server device, with different server devices handling the same mobile device at different times in response to such concerns as load balancing.

Figure 9:
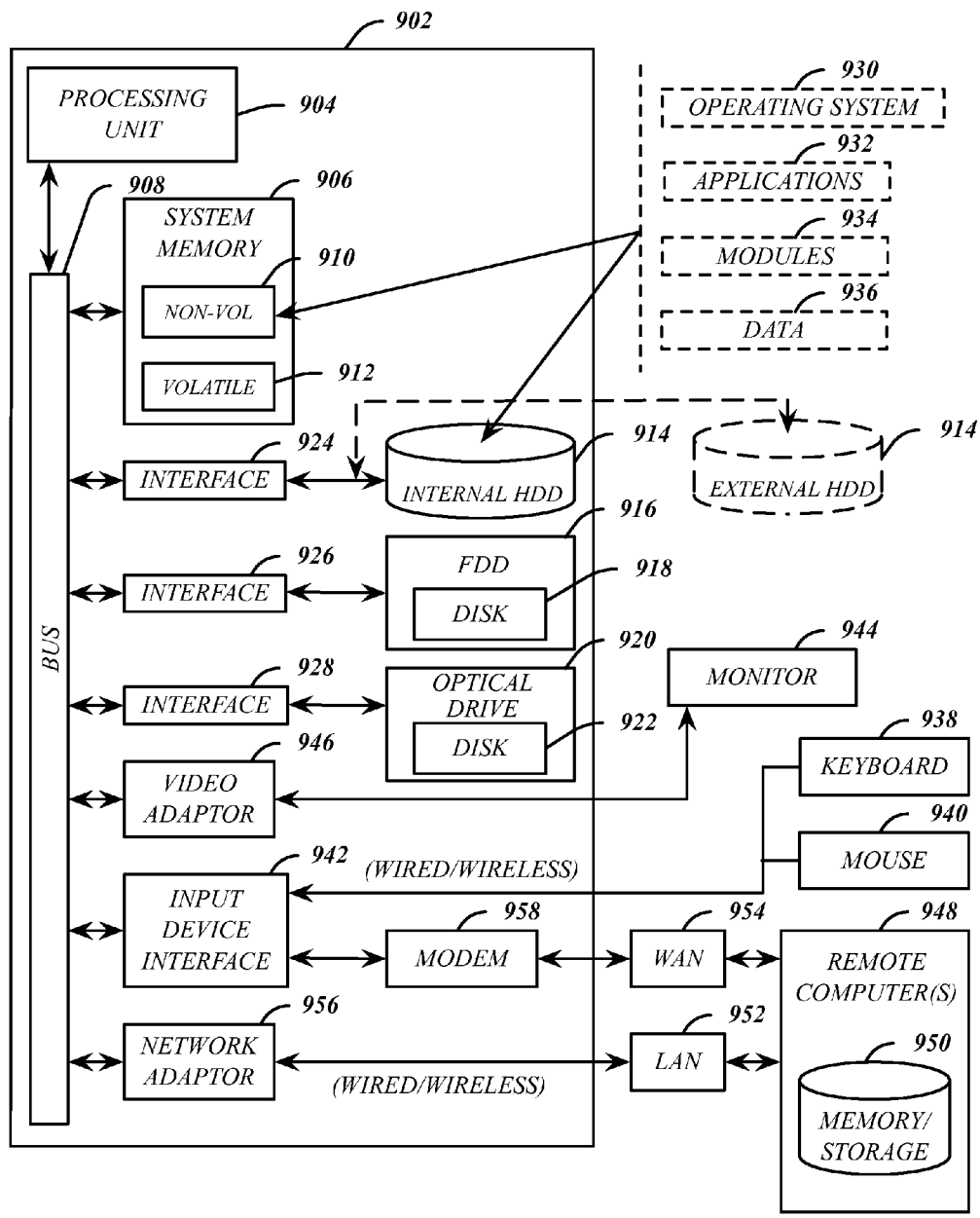
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the mobile cookies system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
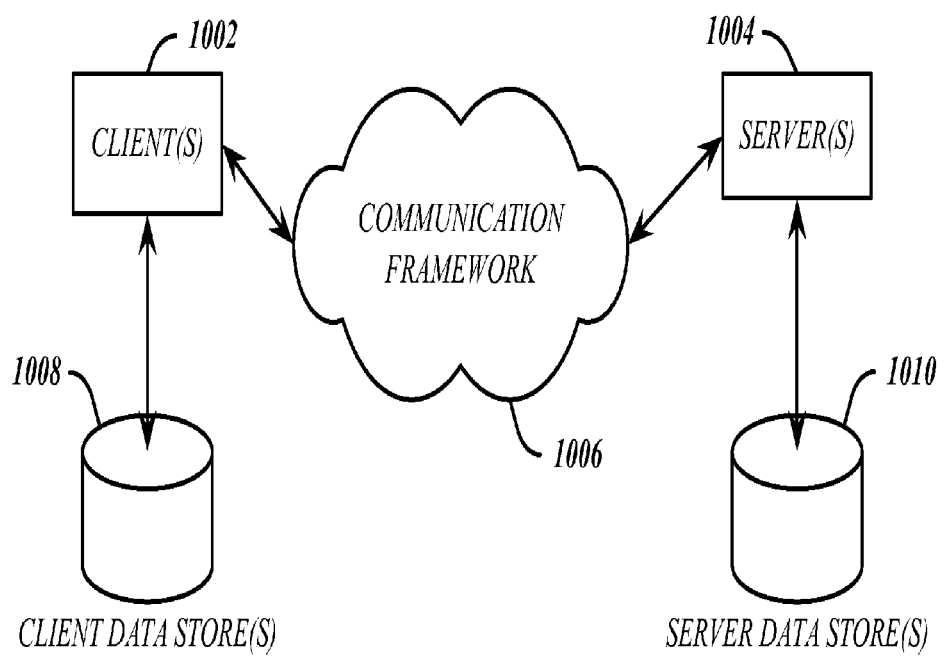
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 910. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
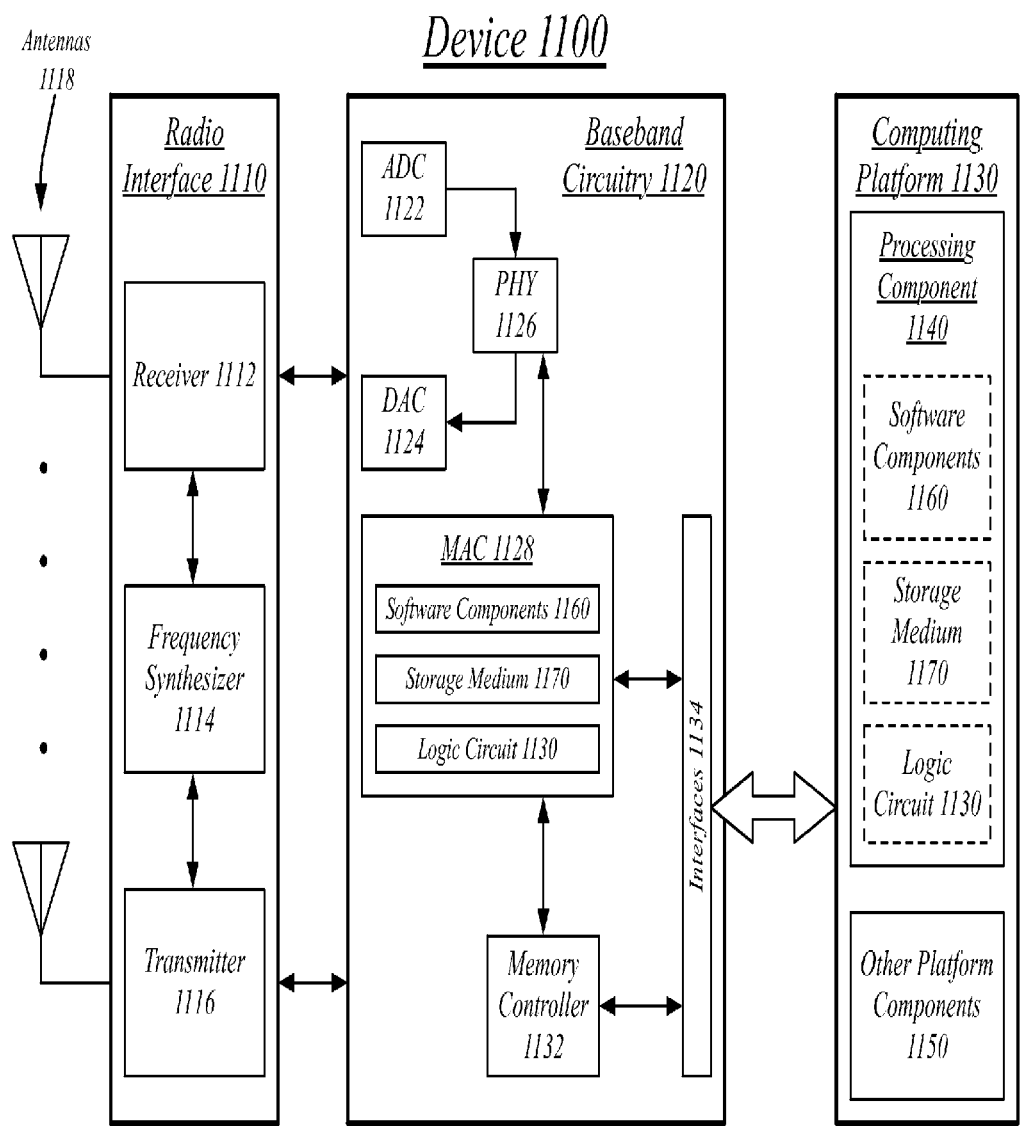
FIG. 11 illustrates an embodiment of a radio device architecture.

FIG. 11 illustrates an embodiment of a device 1100 for use in a multicarrier OFDM system, such as the mobile cookies system 100. Device 1100 may implement, for example, software components 1160 as described with reference to mobile cookies system 100 and/or a logic circuit 1130. The logic circuit 1130 may include physical circuits to perform operations described for the mobile cookies system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the mobile cookies system 100 and/or logic circuit 1130 in a single computing entity, such as entirely within a single device. Alternatively, the device 1100 may distribute portions of the structure and/or operations for the mobile cookies system 100 and/or logic circuit 1130 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the mobile cookies system 100 and logic circuit 1130 using the processing component 1140. The processing component 1140 (and/or PRY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a nethook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Included herein is a set of non-limiting exemplary embodiments that is representative of at least some of the novel aspects of the disclosed architecture. It may be appreciated that not all exemplary embodiments are necessary for a novel implementation and in at least some of the non-limiting exemplary embodiments, the one or more components, instructions, steps, elements, devices, and/or features may vary based at least partially on one or more implementations.

In some non-limiting exemplary embodiments, a computer-implemented method may comprise receiving a data package request from a service, the data package request comprising a network identifier for a mobile device associated with a user; identifying, by a processor circuit, a data package associated with the user based on the network identifier; and transmitting the data package to the service in response to the data package request.

In some non-limiting exemplary embodiments of the computer-implemented method, the data package request received in response to the mobile device associated with the user being detected as present in a geographic location associated with the service based on a detection of the network identifier for the mobile device.

In some non-limiting exemplary embodiments of the computer-implemented method, the network identifier comprising a media access control (MAC) address for a wireless network interface controller (NIC) of the mobile device.

In some non-limiting exemplary embodiments of the computer-implemented method, the data package comprising one or more user configuration preferences associated with the service.

In some non-limiting exemplary embodiments, the computer-implemented method further comprising customizing the service to the user based on the user configuration preferences.

In some non-limiting exemplary embodiments of the computer-implemented method, the data package comprising a user visit record, the user visit record received from the service based on a detection by the service of the network identifier in a geographic location associated with the service.

In some non-limiting exemplary embodiments, the computer-implemented method further comprising receiving a configuration package from the service, the configuration package specifying configuration information; and configuring the mobile device to interoperate with the service based on the configuration information.

In some non-limiting exemplary embodiments, one or more computer-readable non-transitory storage media embodying software that is operable when executed to perform one or more embodiments of the computer-implemented method.

In some non-limiting exemplary embodiments, a system may comprise one or more processors; and at least one memory coupled to the processors and comprising instructions executable by the processors, the processors operable when executing the instructions to perform one or more embodiments of the computer-implemented method.

In some non-limiting exemplary embodiments, a computer program product, preferably comprising a computer-readable non-transitory storage media, that is operable when executed on a data processing system to perform one or more embodiments of the computer-implemented method.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "Wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving, by an interface on a server, a data package request from an entity device distinct from the server, the entity device associated with a public accommodation that provides an in-person service to a user associated with a mobile device, the data package request comprising a network identifier for the mobile device;
retrieving, by a processor circuit on the server distinct from the entity device, a data package associated with the user based on the network identifier, the data package comprising a mobile cookie that includes configuration information comprising a preference value, the configuration information to configure a setting for the in-person service of the public accommodation according to the preference value while the mobile device is physically present in a vicinity of the entity device, the setting comprising at least one of a setting for a thermostat of the public accommodation, a setting for a light of the public accommodation, a setting for a television device of the public accommodation, a setting for a music player of the public accommodation, or a setting for an alarm clock of the public accommodation; and receiving, at the server, a second data package request associated with a second user of a second mobile device;

retrieving a second data package associated with the second user, the second data package comprising a second mobile cookie having a second preference value different than the first preference value;

arbitrating between the first preference value and the second preference value, the arbitrating comprising varying the setting between the first preference value and the second preference value, or jointly accommodating the first preference value and the second preference value when the first preference value and the second preference value are known to be acceptable to both the first user and the second user; and transmitting, by the server distinct from the entity, the data package to the entity device in response to the data package request.

2. The method of claim 1, the data package request received in response to the mobile device associated with the user being detected as present in a geographic location associated with the entity device based on a detection of the network identifier for the mobile device.

3. The method of claim 1, further comprising:
customizing the in-person service to the user based on the user configuration preferences.

4. The method of claim 1, the data package comprising a user visit record, the user visit record received from the entity device based on a detection by the entity device of the network identifier in a geographic location associated with the entity device.

5. The method of claim 1, further comprising:
receiving a configuration package from the entity device, the configuration package specifying configuration information; and
configuring the mobile device to interoperate with the entity device based on the configuration information.

6. An apparatus, comprising:
a processor circuit on a server device;
a services support component operative on the processor circuit to receive a data package request from an entity device, the entity device associated with a public accommodation that provides an in-person service to a user associated with a mobile device, the data package request comprising a network identifier for the mobile device, the entity device being distinct from the server device, and transmit the data package to the entity device in response to the data package request, the data package comprising a mobile cookie that includes configuration information comprising a preference value, the configuration information to configure a setting for the person service of the public accommodation according to the preference value while the mobile device is physically present in a vicinity of the entity device, the setting comprising at least one of a setting for a thermostat of the public accommodation, a setting for a light of the public accommodation, a setting for a television device of the public accommodation, a setting for a music player of the public accommodation, or a setting for an alarm clock of the public accommodation; and a storage component operative on the processor circuit to retrieve the data package associated with the user based on the network identifier,
wherein the services support component is further operative to:
receive, at the server, a second data package request associated with a second user of a second mobile device;
retrieve a second data package associated with the second user, the second data package comprising a second mobile cookie having a second preference value different than the first preference value; and
arbitrate between the first preference value and the second preference value, the arbitrating comprising varying the setting between the first preference value and the second preference value, or jointly accommodating the first preference value and the second preference value when the first preference value and the second preference value are known to be acceptable to both the first user and the second user.

7. The apparatus of claim 6, the data package request received in response to the mobile device associated with the user being detected as present in a geographic location associated with the entity device based on a detection of the network identifier for the mobile device.

8. The apparatus of claim 6, the data package request comprising a service identifier associated with the online service or the in-person service, further comprising:
the storage component operative to identify a plurality of data packages associated with the user based on the network identifier and access the data package from the plurality of data packages based on the service identifier.

9. The apparatus of claim 6, the data package comprising a user visit record, the user visit record received from the entity based on a detection by the entity device of the network identifier in a geographic location associated with the entity device.

10. The apparatus of claim 6, further comprising:
a mobile device configuration component operative to receive a configuration package, the configuration package specifying configuration information, and configure the mobile device to interoperate with the entity device based on the configuration information.

11. At least one non-transitory computer-readable storage medium comprising instructions that, when executed, cause a system to:
receive, at an interface of a server, a data package request from an entity device distinct from the server, the entity device associated with a public accommodation that provides an in-person service to a user associated with a mobile device, the data package request comprising a network identifier for the mobile device, the server distinct from the entity device;
retrieve a data package associated with the user based on the network identifier, the data package comprising a mobile cookie that includes configuration information comprising a preference value, the configuration information to configure a setting for the in-person service of the public accommodation according to the preference value while the mobile device is physically present in a vicinity of the entity device, the setting comprising at least one of a setting for a thermostat of the public accommodation, a setting for a light of the public accommodation, a setting for a television device of the public accommodation, a setting for a music player of the public accommodation, or a setting for an alarm clock of the public accommodation, the retrieving performed by the server distinct from the entity device;

receive, at the server, a second data package request associated with a second user of a second mobile device;

retrieve a second data package associated with the second user, the second data package comprising a second mobile cookie having a second preference value different than the first preference value;

arbitrate between the first preference value and the second preference value, the arbitrating comprising varying the setting between the first preference value and the second preference value, or jointly accommodating the first preference value and the second preference value when the first preference value and the second preference value are known to be acceptable to both the first user and the second user; and transmit, by the server distinct from the entity device, the data package to the entity device in response to the data package request.

12. The non-transitory computer-readable storage medium of claim 11, the data package request received in response to the mobile device associated with the user being detected as present in a geographic location associated with the entity device based on a detection of the network identifier for the mobile device.

13. The non-transitory computer-readable storage medium of claim 11, the data package comprising a user visit record, the user visit record received from the entity device based on a detection by the entity device of the network identifier in a geographic location associated with the entity device.

14. The non-transitory computer-readable storage medium of claim 11, comprising further instructions that, when executed, cause a system to:

receive a configuration package from the entity device, the configuration package specifying configuration information; and configure the mobile device to interoperate with the entity device based on the configuration information.

* * * * *

UNITED STATES PATENT AND TRADEMARK OFFICE
CERTIFICATE OF CORRECTION

PATENT NO. : 9,948,476 B2  
APPLICATION NO. : 15/378345  
DATED : April 17, 2018  
INVENTOR(S) : Daniel Kim and Yen-Ting Tung Page 1 of 1

It is certified that error appears in the above-identified patent and that said Letters Patent is hereby corrected as shown below:

In the Specification

Column 15, Line 16, replace "wireless MC" with -- wireless NIC --.

Column 17, Line 46, replace "8104" with -- 810-1 --.

Column 20, Line 37, replace "modern" with -- modem --.

Column 22, Line 57, replace "PRY" with -- PHY --.

Column 23, Line 50, replace "nethook" with -- netbook --.

Column 26, Line 36, replace "Wherein" with -- wherein --.

In the Claims

Column 27, Line 4, replace "accommodation; and" with -- accommodation; --.

Signed and Sealed this  
Nineteenth Day of June, 2018

Andrei Iancu  
*Director of the United States Patent and Trademark Office*